United States Patent Office 3,241,979
Patented Mar. 22, 1966

3,241,979
HIGHER FATTY ACID ESTERS OF TETRAHY-
DROXYLATED CYCLOOCTADIENE AND THEIR
USE IN SALAD OILS
Henry B. Sinclair, Green Township, Hamilton County,
Ohio, assignor to The Procter & Gamble Company,
Cincinnati, Ohio, a corporation of Ohio
No Drawing. Filed Mar. 19, 1963, Ser. No. 266,217
6 Claims. (Cl. 99—163)

This invention relates to a new composition of matter. More particularly, it relates to a novel composition of matter formed by oxidative tetrahydroxylation of cyclooctadiene followed by esterification with higher fatty acid. This invention further relates to low-temperature-stable clear glyceride salad oils containing said novel composition of matter.

It is known that cycloolefinic compounds such as 1,5-cyclooctadiene and 1,5,9-cyclododecatriene can be prepared by polymerization of diolefins with alkyl metal type catalysts. The synthesis of 1,5-cyclooctadiene, in particular, by dimerization of butadiene with derivatives of nickel carbonyl is described in detail in U.S. Patent 2,686,209, granted to Reed, August 10, 1954.

There are three stereoisomers of 1,5-cyclooctadiene. They are cis, cis; trans, trans; and cis, trans. The first-named isomer is shown by formula set forth below:

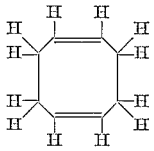

Cis, cis; Boiling Point, 150° C.,

Freezing Point, —60° C.

It will be understood that any of the three isomers or mixtures thereof can be utilized in the practice of this invention as described hereinafter to form reaction products with substantially the same properties.

The present invention is directed to the conversion of 1,5-cyclooctadiene into derivative compounds of matter which can be dissolved in a clear base glyceride oil to form a superior salad oil having excellent resistance to deposition of high-melting solids at low temperatures.

Oils which are suitable for salad use frequently are stored in refrigerators. The prolonged cooling of such oils to temperatures normally encountered in refrigerators, such as from about 40° F. to about 50° F., generally results in the deposition of crystalline material, usually solid triglycerides, from the oil. This material may appear in the form of a cloud, or as clusters of crystals, and is considered objectionable by the housewife. In general, the tendency to form solid glycerides in oils also adversely affects the suitability of the oil for use in mayonnaise emulsions. Mayonnaise emulsions prepared from such oils tend to be unstable at low temperatures and are easily broken.

Frequently it is desirable to hydrogenate natural vegetable oils, such as soybean oil, in order to improve their oxidative stability. This hydrogenation will tend to raise the melting point and to produce components of decreased solubility, causing the oils to have the undesirable properties described hereinbefore.

A large proportion of the high melting glycerides can be removed from oils by the process known as "winterizing" in which the oils are carefully cooled to low temperatures for extended periods of time to permit precipitation of solid material. Such solids then can be removed by filtration or other separation procedures. However, in usual commercial practice, not all of the high-melting solid material is removed from the oils by this processing, and the oils still tend to cloud when stored for extended periods of time at sufficiently low temperatures. Moreover, the usual winterizing treatment undesirably tends to remove by entrainment a substantial portion of the olein fraction of the oil.

A primary object of this invention is to prepare a novel composition of matter which can be dissolved in a clear base glyceride oil to form an improved salad oil having excellent resistance to deposition of high-melting solids at low temperatures.

It has now been found according to the present invention that the storage time at low temperatures without clouding can be greatly extended for a given salad oil by dissolving therein from about 0.001% to about 1%, by weight, of crystallization inhibitor which is the composition of matter formed by oxidative tetrahydroxylation of cyclooctadiene followed by esterification with higher fatty acid having from about 14 to about 22 carbon atoms.

The cyclooctadiene derivative material of this invention can be conveniently formed from 1,5-cyclooctadiene by the consecutive reactions of diepoxidation, solvolysis, and hydrolysis to give the tetraol derivative thereof. The tetraol then can be converted directly into the ester by reaction with a higher acyl chloride having from about 14 to about 22 carbon atoms. A preferred method of preparation comprises reacting 1,5-cyclooctadiene with an excess of peracid, such as peracetic or perbenzoic acid, in the presence of sodium acetate to form the diepoxide; solvolysts of the diepoxide with an excess of glacial acetic acid in the presence of sodium acetate to form the diacetoxydihydroxy derivative; reduction of the diacetoxy ester group with lithium aluminum hydride and/or alkaline hydrolysis to form the tetraol; and reaction of the tetraol with the higher acyl chloride having from about 14 to about 22 carbon atoms, such as palmitoyl chloride, in pyridine solvent.

Theoretically, the cyclooctadiene is dihydroxylated at each double bond position in the ring to form the tetraol derivative thereof; and the tetraol is completely esterified to form the tetraester, such ester being specifically 1,2,5,6-tetraacyloxycyclooctane. In actual practice, however, the final reaction product may comprise a mixture of substances which includes, in addition to said tetraester, other compounds such as partial esters, transannular reaction products, and double ring compounds. It should be understood that all compositions of matter and any mixture thereof formed by the oxidative tetrahydroxylation of cyclooctadiene followed by esterification with higher fatty acid having from about 14 to about 22 carbon atoms are contemplated within the scope of this invention, even though the reaction products are referred to herein as tetraesters.

It should be understood that other conventional methods of esterification are contemplated within the scope of this invention, for example, esterification with fatty acid, fatty acid anhydride, and methyl ester of fatty acid.

Although specific methods of preparing the aforesaid tetraesters are described herein, it is not intended that the invention should be limited to a particular method of oxidative tetrahydroxylation and fatty acid esterification.

The procedure for measuring the resistance of salad oils to clouding and the crystal inhibiting activity of the tetraesters as used hereinafter involves holding the oil or oil with inhibitor at a temperature of about 30° F. until a cloud forms in the oil. As used herein, the term "chill test" is intended to define the length of time, after cooling the oil to 30° F. (unless some other temperature is specified), until such a cloud forms.

A wide variety of oils can be used as base salad oils in the practice of this invention, either individually or as mixtures of oils. Included among suitable oils are the so-called natural salad oils such as olive oil, sunflower seed oil, safflower oil, and sesame oil. Oils such as cottonseed oil and corn oil preferably are given a preliminary "winterizing," de-waxing, or similar other treatment to remove the higher-melting solids to form a good base salad oil. Other oils, such as soybean oil, may require some hydrogenation to improve resistance to oxidative deterioration with prolonged storage, and the higher-melting glycerides formed during this hydrogenation treatment preferably are removed by winterization. Base salad oils also can be formed by directed, low-temperature interesterification of animal and vegetable fatty materials, followed by removal of higher-melting glycerides formed during the reaction. See, for example, U.S. Patent 2,442,532, granted to E. W. Eckey, June 1, 1948. Another group of oils includes those in which one or more short-chain fatty acids having from 2 to about 6 carbon atoms, such as acetic and propionic acids, replace, in part, the longer-chain fatty acids present in natural triglyceride oils. Other base salad oils will suggest themselves to those skilled in the art, provided they have a suitable chill test as hereinbefore defined. As used herein, the term "base salad oil" is intended to include any salad oil which will not form solids immediately when cooled to 30° F.

The tetraester and the base salad oil can be mixed together in any convenient manner. For example, the ester in liquid form can be readily mixed with the oil. If the ester is in solid form, it can be dissolved in the oil, although it may be desirable to heat the oil or the mixture of oil and ester to facilitate solution. It is to be kept in mind, however, that in all cases the resulting product is merely a physical mixture and there is no chemical reaction between the ester and the oil.

The following example will serve to further illustrate the invention.

*Example*

A solution prepared by dissolving 15.5 g. of anhydrous sodium acetate in 125 g. of 40% peracetic acid was added over a period of 45 minutes to 54 g. of 1,5-cyclooctadiene; the reaction mixture was stirred vigorously and its temperature was held between 25–30° C. during the addition. A second portion of a like amount of sodium acetate in peracetic acid was added to the 1,5-cyclooctadiene reaction mixture in the same manner. The total reaction mixture was stirred for 30 minutes after the final addition while the temperature was held between 25–30° C. The mixture then was placed in a 0° C. constant temperature room for 12 hours. The mixture was adjusted to about pH 11 with 40% potassium hydroxide solution and extracted with five 300 ml. portions of diethyl ether. After drying the ethereal extract over anhydrous $MgSO_4$, the ether was removed under aspirator vacuum to give 32.7 g. of material, which was distilled in vacuo at 118° C. at 12 mm. Hg pressure to yield 24.5 g. of the diepoxide derivative of 1,5-cyclooctadiene.

A mixture of 14 g. of the above diepoxide, 200 ml. of glacial acetic acid and 16 g. of anhydrous sodium acetate was heated on a steam bath for a period of about 12 hours. The acetic acid was removed from the reaction mixture by aspirator vacuum and warming on a steam bath. The residue was mixed into 100 ml. of a 1:1 solution of water and saturated salt solution and extracted with three 100 ml. portions of ether. The pH of the aqueous portion was adjusted to about 11 with solid potassium hydroxide and extracted again with three 100 ml. portions of ether. The ethereal extracts were combined and dried over anhydrous $MgSO_4$. After separation of the $MgSO_4$ by filtration, the ether was removed by aspirator vacuum to yield 13.3 g. of diacetoxy-dihydroxylcyclooctane; it was an oil, most of which crystallized to a solid of M.P. 45.5–47.5° C. when freed of adhering oil.

To a slurry of 2 g. of lithium aluminum hydride in 100 ml. of anhydrous diethyl ether, 12 g. of the above diacetoxy-dihydroxycylooctane dissolved in 150 ml. anhydrous diethyl ether was added dropwise over a period of 1 to 1½ hours while the reaction mixture was stirred and cooled in an ice bath. After the addition of the cyclooctane derivative was completed, the ice bath was removed and the reaction mixture was heated to reflux for one hour. With vigorous stirring and good cooling, the following reagents were added consecutively, with about 10 minute intervals between additions: 2 ml. water, 2 ml. 15% sodium hydroxide solution and 6 ml. water. After stirring for about an additional 45 minutes, the ether layer was decanted, dried over anhydrous $MgSO_4$ and concentrated under aspirator vacuum. Examination of this oily residue by infrared spectroscopy revealed the acetoxy cleavage was incomplete. The residue, 7.5 g., was placed in 100 ml. of methanol which contained 10 g. of potassium hydroxide, and the methanolic solution was heated to reflux for 1½ hours. The mixture was concentrated to about one-half volume by aspirator vacuum and 50 ml. of saturated salt solution was added. The solution was extracted with three 100 ml. portions of diethyl ether, followed by extraction with three 100 ml. portions of ethyl acetate. Both extracts were dried over anhydrous $MgSO_4$ and concentrated under aspirator vacuum to yield, from the ether and from the ethyl acetate respectively, 1.8 g. and 1.2 g. of hydroxylated product.

A reaction mixture consisting of 1.8 g. of the above-mentioned hydroxylated product, 10.2 g. of palmitoyl chloride, 3.7 g. of pyridine and 14.6 ml. of dimethylformamide was allowed to stand at room temperature for about 12 hours. The reaction mixture was poured into an equal volume of water and extracted with diethyl-ether. The ethereal extract was washed consecutively with two 400 ml. portions of water, 100 ml. of 10% sodium bicarbonate solution and 100 ml. of water and dried over anhydrous $MgSO_4$. After separation of the $MgSO_4$ by filtration, the ether was removed by warming on the steam bath to yield the desired esterified composition of matter; Melting Point 58.5–60° C.; saponification value found 186.7; saponification value calcd. 198.6; total fatty acid found 92.5%, total fatty acid calcd. 90.9%. (Calcd. basis: 1,2,5,6-tetrapalmitoyloxycyclooctane.)

Solution of 0.1%, by weight, of the above ester in a base salad oil consisting of 90% winterized cottonseed oil (refined and bleached) and 10% cottonseed oil (refined and bleached) lengthened the chill test from 12 hours to greater than 48 hours.

Perbenzoic acid can be substituted for the peracetic acid in the above example with substantially equal results.

Other tetraacyloxycyclooctanes containing acyl radicals having from about 14 to about 22 carbon atoms, such as myristoyl, stearoyl, and behenoyl, can be prepared in the manner described above by using equivalent amounts of the appropriate acyl chloride. When from about 0.001% to about 1%, by weight, of at least one of said tetraacyloxycyclooctanes is dissolved in a base salad oil such as winterized cottonseed oil, peanut oil, and soybean oil, comparable improvements in chill test are obtained. If too large an amount of inhibitor is present, it will be precipitated out of the oil as the oil-inhibitor mixture is cooled and possibly even promote crystallization of high-melting solids in the oil. Too small an amount of inhibitor, of course, will be relatively ineffective. Amounts of ester in excess of about 1%, by weight, are unnecessary as affording no significant added improvement of the oil; and it is preferred to use about 0.1%.

It will be understood that the esterified composition of matter of this invention is not limited to its use as a salad oil crystal inhibitor. The crystal inhibiting activity of the composition of matter suggests that it can also be used as a salad oil crystal modifier whereby it will materially improve the filtration of high-melting solids from the salad oil during conventional "winterizing" treatments.

What is claimed is:

1. Higher fatty acid esters of tetrahydroxylated cyclooctadiene containing fatty acid groups having from about 14 to about 22 carbon atoms.

2. A clear glyceride salad oil having improved resistance to deposition of high-melting solids and comprising a base salad oil having dissolved therein from about 0.001% to about 1%, by weight, of higher fatty acid esters of tetrahydroxylated cyclooctadiene containing fatty acid groups having from about 14 to about 22 carbon atoms.

3. The clear glyceride salad oil of claim 2 in which the higher fatty acid is palmitic acid.

4. The clear glyceride salad oil of claim 2 in which the base salad oil is derived from cottonseed oil.

5. The clear glyceride salad oil of claim 2 in which the esters are tetraesters.

6. A clear glyceride salad oil having improved resistance to deposition of high-melting solids and comprising a base salad oil derived from cottonseed oil having dissolved therein about 0.1%, by weight, of higher fatty acid esters of tetrahydroxylated cyclooctadiene containing fatty acid groups having from about 14 to about 22 carbon atoms.

References Cited by the Examiner

UNITED STATES PATENTS

| | | | |
|---|---|---|---|
| 2,435,626 | 2/1948 | Gooding | 99—118 |
| 2,437,648 | 3/1948 | Milas | 260—617 |
| 2,500,599 | 3/1950 | Bergsteinsson et al. | |
| 2,686,209 | 8/1954 | Reed | 260—617 |
| 3,026,357 | 3/1962 | Scott | 260—617 |

OTHER REFERENCES

Cope et al.: "Journal of the American Chemical Society," April 5, 1959, pp. 1643 to 1650.

A. LOUIS MONACELL, *Primary Examiner.*